United States Patent [19]

Bitterich

[11] Patent Number: 5,699,734
[45] Date of Patent: Dec. 23, 1997

[54] GUARD PROVIDED AT A PRINTING MACHINE

[75] Inventor: Wolfgang Bitterich, Kirchardt, Germany

[73] Assignee: Heidelberger Druckmaschinen Aktiengesellschaft, Heidelberg, Germany

[21] Appl. No.: 697,853

[22] Filed: Aug. 29, 1996

[30] Foreign Application Priority Data

Aug. 29, 1995 [DE] Germany ............ 195 31 643.6

[51] Int. Cl.$^6$ ............................................. B41F 1/64
[52] U.S. Cl. ................... 101/216; 101/212; 101/415.1
[58] Field of Search ................... 101/216, 415.1, 101/477, 212, 174, 178, 136, 141, 142, 144, 114, 116

[56] References Cited

U.S. PATENT DOCUMENTS

| | | | |
|---|---|---|---|
| 4,669,380 | 6/1987 | Seib et al. | 101/216 |
| 5,361,699 | 11/1994 | Compera | 101/477 |
| 5,440,988 | 8/1995 | Ito | 101/477 |
| 5,479,858 | 1/1996 | Beisel et al. | 101/477 |
| 5,487,336 | 1/1996 | Simeth | 101/216 |

FOREIGN PATENT DOCUMENTS

| | | | |
|---|---|---|---|
| 00633229 | 10/1982 | European Pat. Off. . | |
| 0665103 | 8/1995 | European Pat. Off. . | |
| 3115475 | 11/1982 | Germany . | |
| 0253006 | 1/1988 | Germany | 101/216 |
| 0253007 | 1/1988 | Germany | 101/216 |
| 4214049 | 11/1993 | Germany . | |
| 4402158 | 2/1995 | Germany . | |
| 2288861 | 11/1995 | United Kingdom . | |

*Primary Examiner*—Christopher A. Bennett
*Attorney, Agent, or Firm*—Nils H. Ljungman and Associates

[57] ABSTRACT

A guard provided on a printing machine, the guard safeguarding perpendicularly a printing unit/coating unit, on both sides thereof, between the side frames and covering horizontally an upper area. Parts of the guard being mounted, on both sides thereof, on swivel arms and are liftable in an opened position, with a spring element supporting this motion such that the side parts may be lifted from a closed position independently of each other, with the upper part of the guard being lifted as well.

14 Claims, 5 Drawing Sheets

GUARD PROVIDED AT A PRINTING MACHINE

BACKGROUND OF THE INVENTION

1. Field of the Invention

This invention generally relates to a guard provided at a printing machine, the guard safeguarding perpendicularly a printing unit/coating unit between the side frames, on both sides thereof, and covering horizontally the upper area. Parts of the guard are supported by spring elements, with the two perpendicular side parts being liftable from a closed position independently of each other, and with the upper part being provided horizontally,. when in a closed position, and being lifted as well when lifting a side part via a hinge connection.

2. Background Information

Large-area protective coverings are used on printing machines in various ways in order to protect the operating personnel against accidents while the machine is running. Such protective coverings may be opened at standstill of the machine in order to permit as much as possible free access to the individual machine parts. In particular, the printing units of a printing machine, having a plurality of rotating cylinders and rollers, have to be secured by means of guards in that a switching operation automatically causes a standstill of the machine when the guard is being opened. With the maintenance work and the adjusting operations being carried out at standstill of the machine, it is essential for the machine operator to obtain, in spite of the guards, the greatest possible access to the individual parts of the printing machine (German Patent No. 31 15 475A1), without the guards representing mutual obstacles.

OBJECT OF THE INVENTION

Proceeding from these facts it is the object of the present invention to design a guard so as to permit optimum accessibility to the parts of a printing machine.

SUMMARY OF THE INVENTION

According to the present invention, this object can be achieved in that, via pivots, the upper part of the guard is preferably pivot-mounted on one side of a frame having the length of the upper part, that, via pivots, the first side part can be pivot-mounted on the same side of the frame, that, via pivots, the second side part can be pivot-mounted on the upper part, and that the other side of the frame can be pivot-mounted on the machine side frames via trunnions.

By providing such a simplified guard on a printing unit, for example, on a sheet-fed rotary printing machine, the pressman may lift one side part or both side parts and thus gain free access to, for example, the inking unit of the machine from above. Thus, the pressman does not have to swing away or remove several parts of a guard in order to carry out a maintenance job, for example.

A further development is characterized in that, via pivots, the second side part can be connected to swivel arms being supported, via trunnions, on the side frames of the machine, and that, via bolts, a spring element acts on the swivel arms, the spring element supporting the frame in the vicinity of the trunnions via bolts.

Due to this advantageous embodiment of the present invention featuring only one spring element, the opening and closing of the guard is facilitated and the opened position of the guard is secured.

When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby assert that the disclosure of this application may include more than one invention, and, in the event that there is more than one invention, that these inventions may be patentable and non-obvious one with respect to the other.

One feature of the instant invention resides broadly in a protective guard for a printing machine, the printing machine having two substantially vertical side frames and at least one unit disposed between the side frames, said guard comprising: a closed position wherein access to said unit is substantially prevented; a first part and a second part both being disposed substantially vertical in said closed position; said first part having an upper end portion and a lower end portion disposed opposite one another; said second part having an upper end portion and a lower end portion disposed opposite one another; a third part disposed substantially horizontal in said fully closed position and connecting said upper end portion of said first part and said upper end portion of said second part; a fourth part disposed substantially horizontal in said closed position and adjacent said third part; said fourth part having a first end portion and a second end portion disposed substantially opposite one another, said first end portion being disposed adjacent said first part and said second end portion being disposed adjacent said second part; said third part having a first length; said fourth part having a second length; said first length and said second length being substantially equal to one another; at least one first pin configured for pivotally mounting said third part to said first end portion of said fourth part; at least one second pin configured for pivotally mounting said first part to said first end portion of said fourth part; at least one third pin configured for pivotally mounting said second part to said third part; and at least one trunnion disposed for pivotally mounting said fourth part to the side frames of the printing machine.

A feature of the invention resides broadly in a protective guard for a printing machine, the printing machine having two substantially horizontal side frames and at least one unit disposed between the side frames, said guard comprising: a closed position wherein access to said unit is substantially prevented; a first part; a second part; said first part and said second part being substantially vertical in said closed position; a third part disposed between said first part and said second part; said third part being substantially horizontal in said closed position; means for permitting said first part and said second part to be movable from said closed position independently of one another; and means for permitting said third part to be movable along with at least one of said first and said second part.

DESCRIPTION OF THE PREFERRED EMBODIMENT

Figure 1:
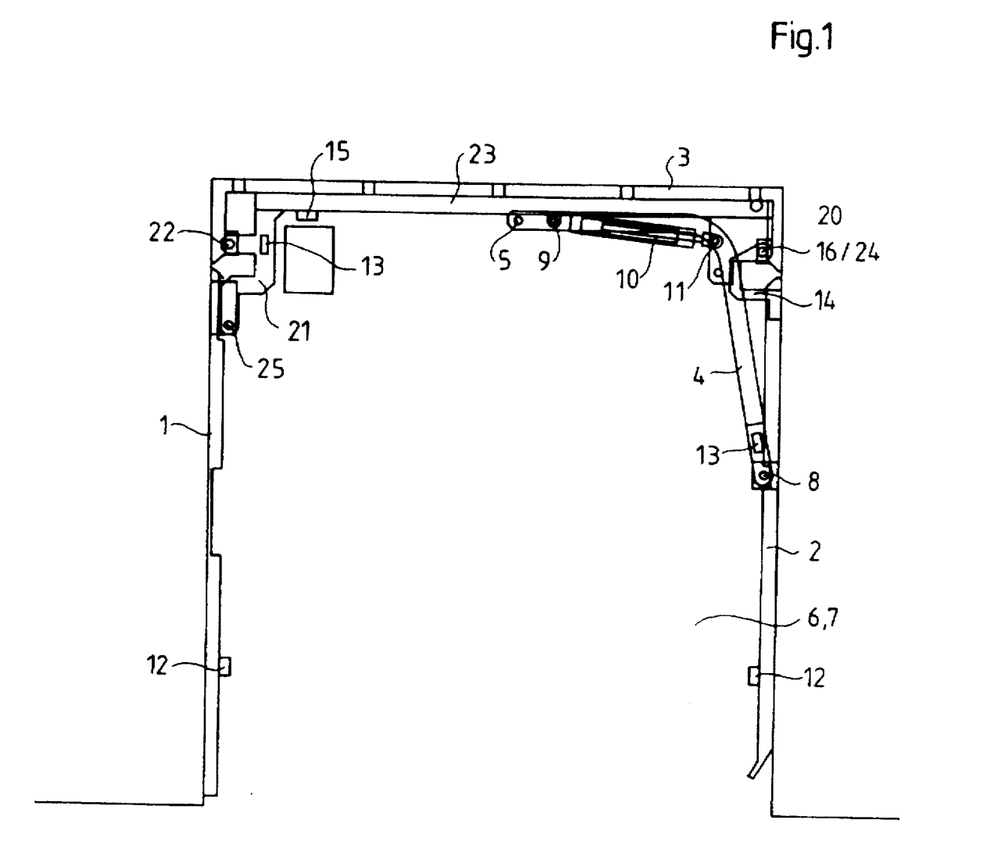
FIG. 1 is a side elevational view of the guard provided on a printing unit/coating unit of a printing machine.

The guard shown in FIG. 1 covers a coating unit of a printing machine, for example, when in a closed position. In this case, the guard is provided between the side frames 6, 7 of the machine and includes two side parts 1, 2. In the closed position, said side parts 1, 2 are arranged essentially perpendicularly, and an upper part 3 is arranged essentially horizontally. The swivel arms 4 for the right side part 2 are mounted in the machine side frames 6, 7 via trunnions 5, 5'; with the respective other end the swivel arms 4 are fastened to the side part 2 via pivots 8. In the vicinity of the trunnion 5, a spring element 10 is supported on the swivel arm 4 via a bolt 9, said spring element 10 being fastened to bearing body 20 by means of a bearing bolt 11. In closed position, the side parts 1, 2 abut, on both sides thereof, against stops 12, said stops 12 being also fastened to the machine side frames 6, 7. A cross-member 13 serves to stabilize the swivel arms 4 and is secured therebetween. The side parts 1, 2 may be opened by hand. In the embodiment shown, the side parts 1, 2 may be made, for example, of perforated metal sheets, and the upper part 3 may consist, for example, of safety glass and feature an appropriate frame. The machine side frames 6, 7 feature stops 15 provided for the upper part 3.

According to FIG. 1, the right side part 2 is mounted with both sides thereof on the upper part 3 via connecting elements 14 and pins 16. The right side part 2 may also be easily opened by hand.

The upper part 3 of the guard is pivot-mounted on a frame 23 via bearing body 21 and pin 22. Via trunnions 24, 24', the frame 23 is mounted in the machine side frames 6, 7 on the side facing the pins 22. At the same time, the side part 1 is swivellably connected to the upper part 3 via bearing body 21 and pin 25. Furthermore, the side part 2 is swivellably connected to the upper part 3 via pins 16 so as to be in alignment with the trunnions 24, 24' being in an idle position.

Figure 2:
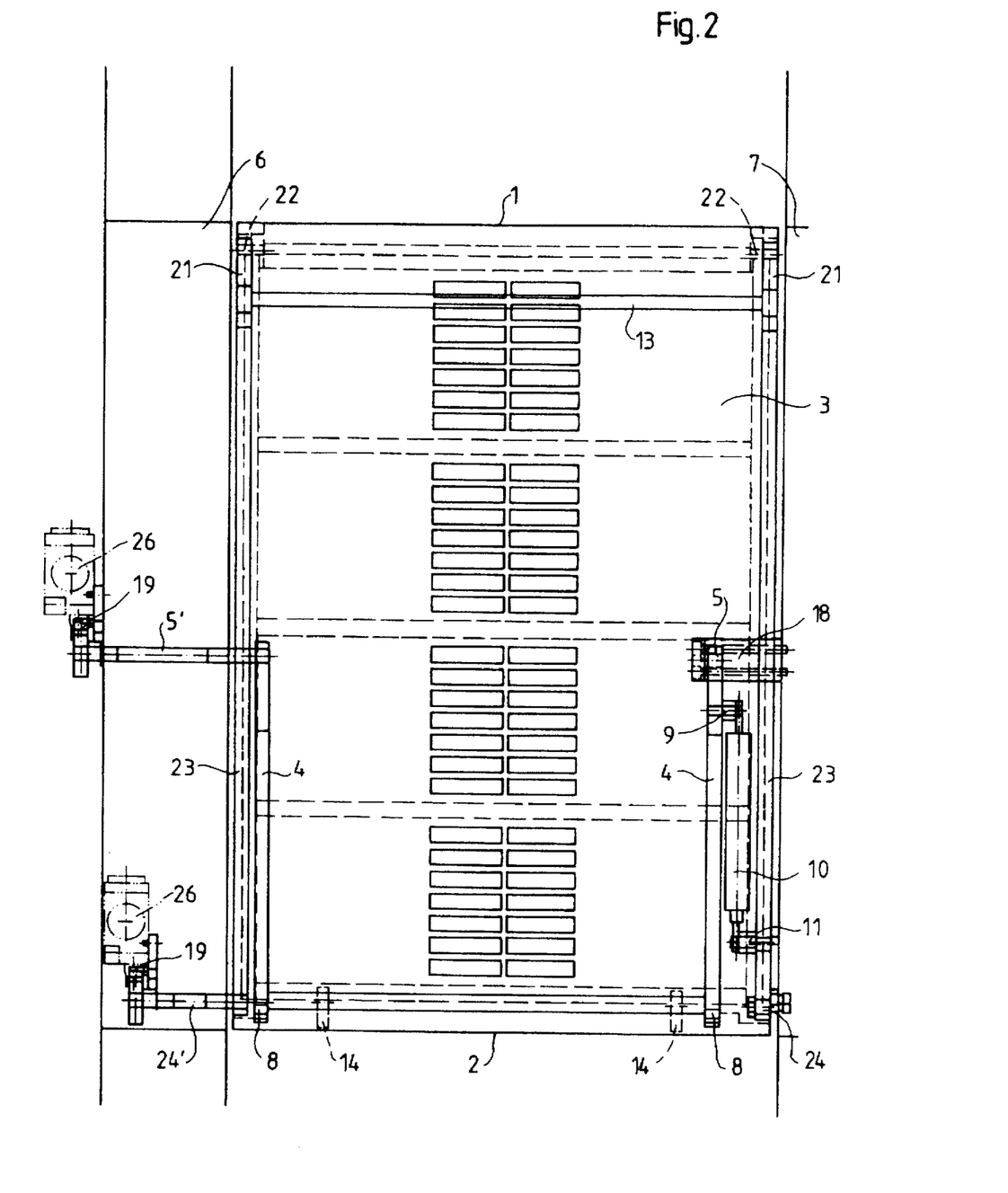
FIG. 2 is a top elevational view of the guard.

As shown in FIG. 2, electric circuit breakers 26 may be assigned to the trunnions 5', 24', said circuit breakers 26 bringing the machine to a standstill or preventing the machine from being started when opening the side parts 1, 2. Actuating devices 19 are provided on the trunnions 5', 24' in order to actuate the circuit breakers 26. The trunnion 5 for the swivel arm 4 is mounted on the right side of the machine side frame 7 via a supporting member 18.

Figure 3:
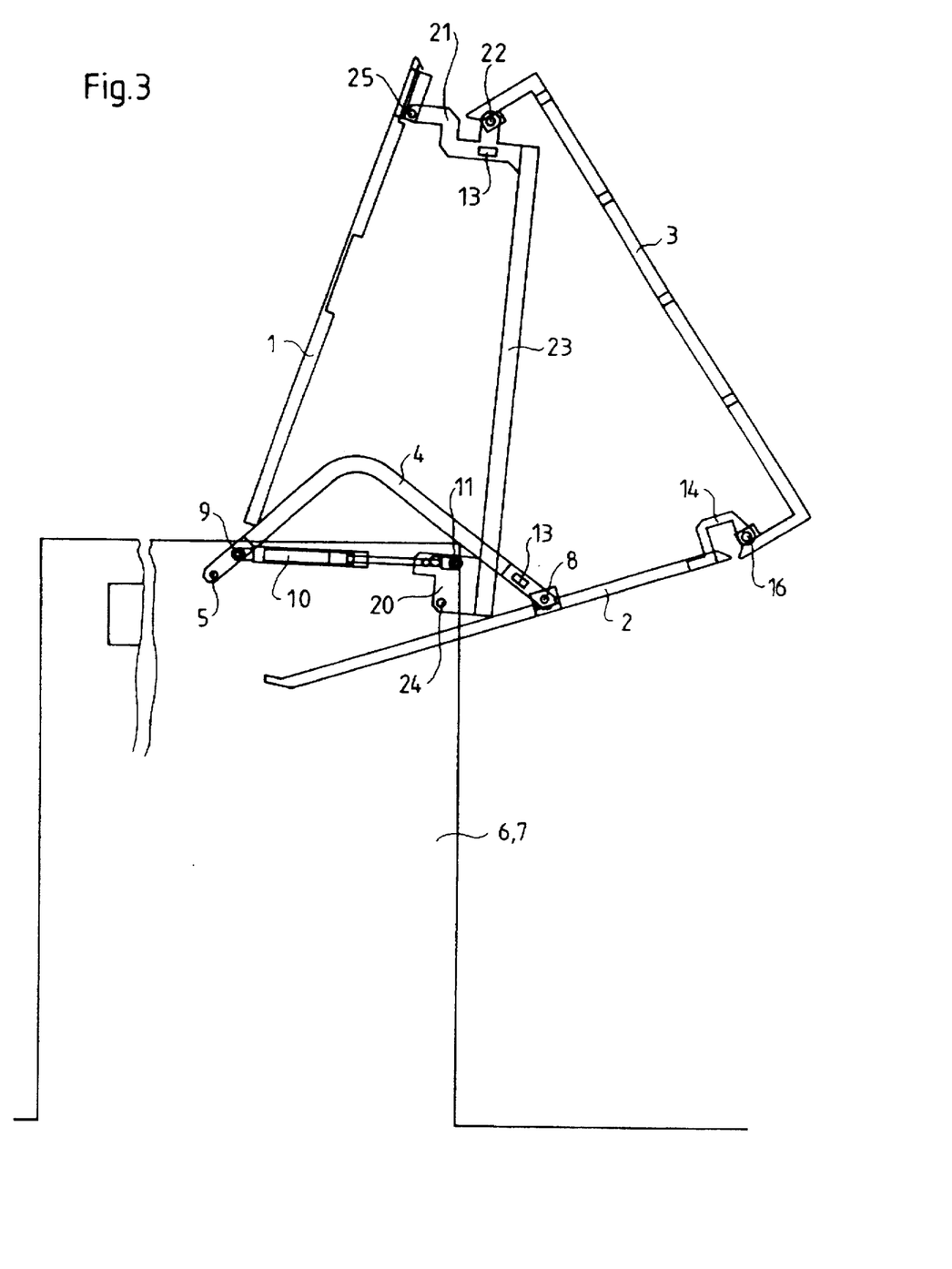
FIG. 3 shows a guard opened on both sides.

FIG. 3 shows the guard in an opened position, with both side parts 1, 2 being swung upwards so that, in the position shown, the upper part 3 is also swung away. Due to the advantageous hinge connections it is thus possible to open the upper part of the machine part to such an extent that, on both sides thereof, said upper part is freely accessible to the pressman.

Figure 4:
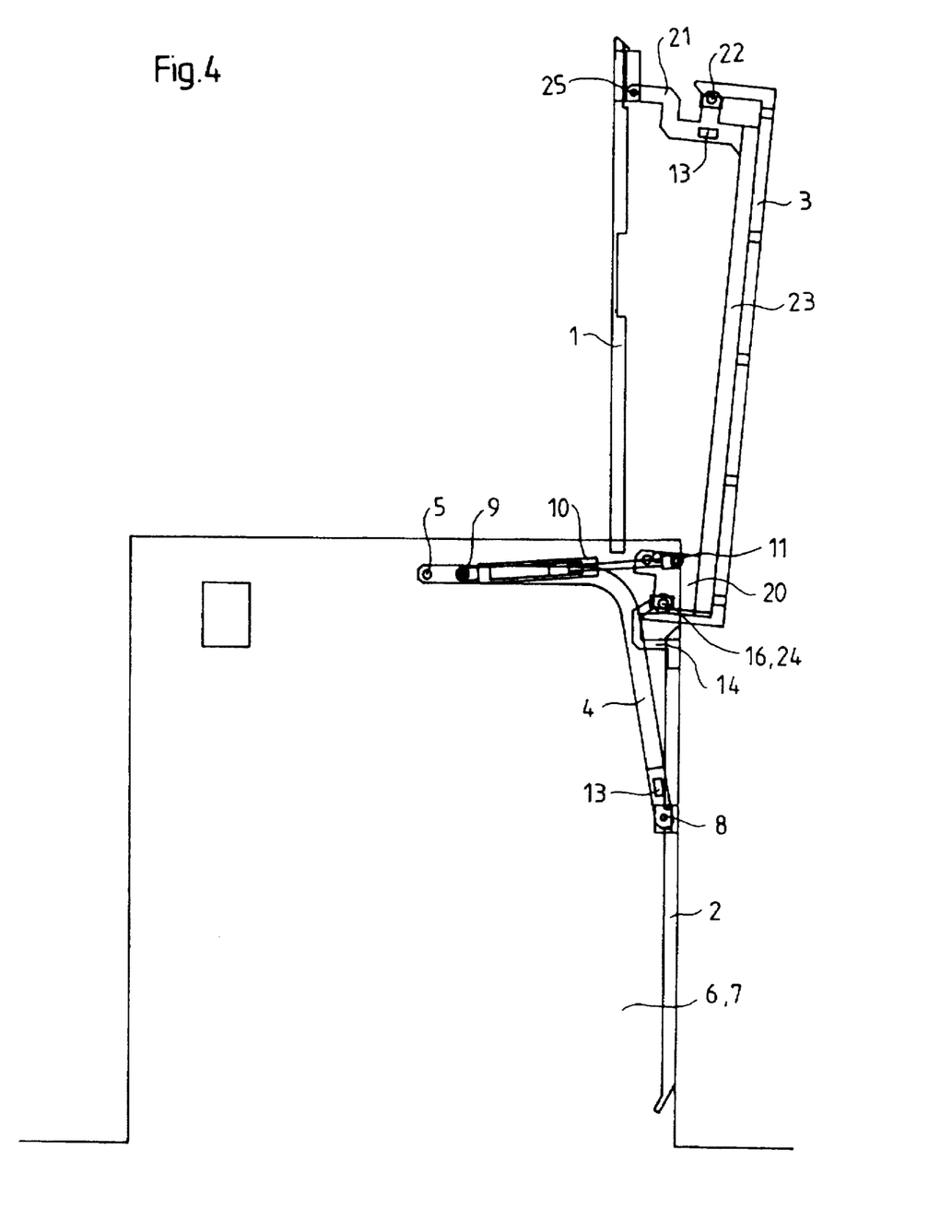
FIG. 4 shows a guard opened on the left side.

FIG. 4 differs from the aforementioned figures in that only the left side with side part 1 and upper part 3 is opened.

Figure 5:
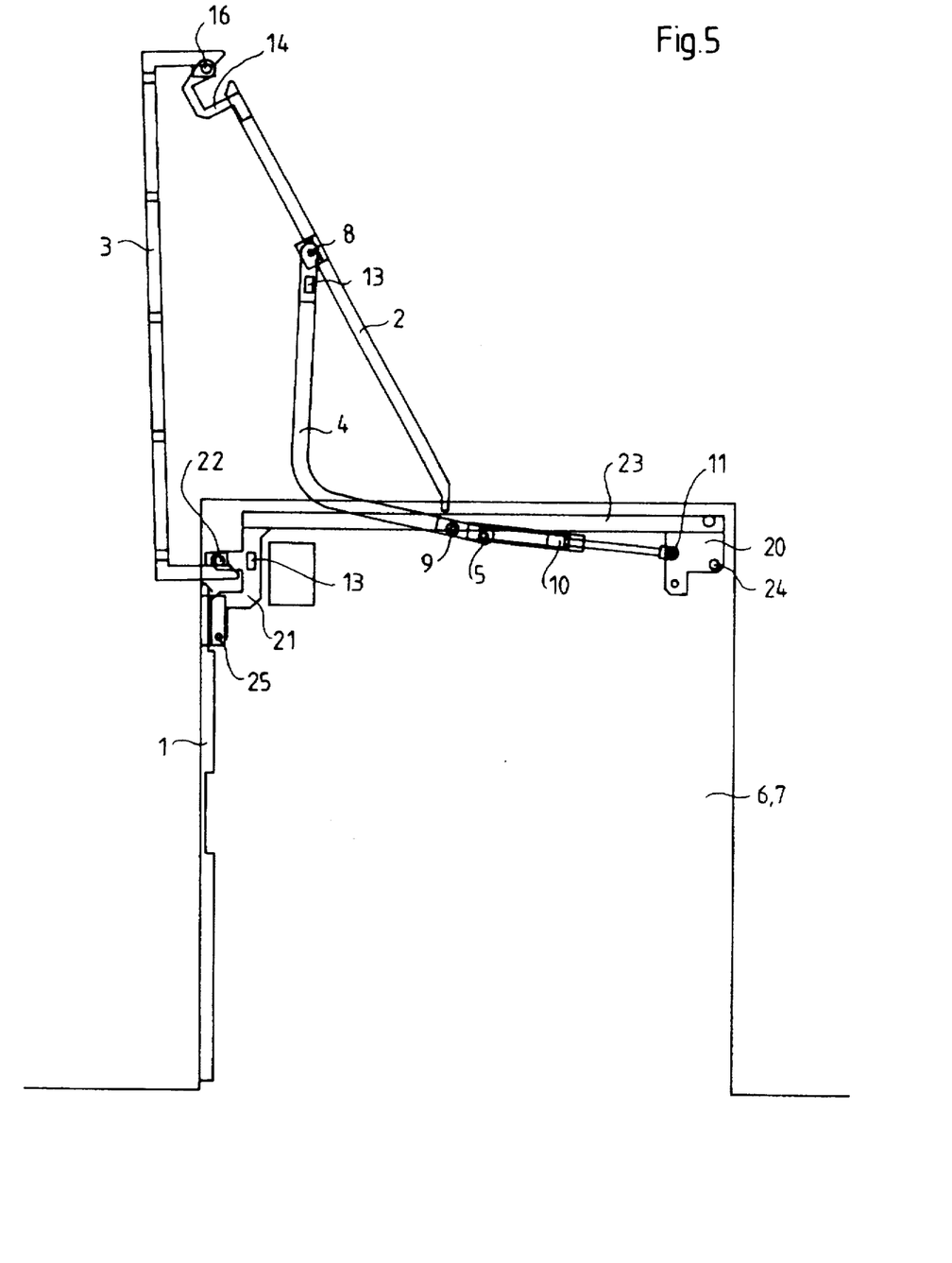
FIG. 5 shows a guard opened on the right side.

FIG. 5 shows the right side part 2 and the upper part 3 being opened, with the side parts 1, 2, when in an opened position, being supported by the force of the spring element 10. Thus, it is possible for the pressman to gain, as desired, free access to the respective machine part, whereby the machine may be blocked via a limit switch when opening the guard so that the machine is prevented from starting or continuing to run in order to essentially eliminate for the pressman the risk of an accident.

One feature of the invention resides broadly in the guard provided on a printing machine, said guard covering perpendicularly a printing unit/coating unit between the side frames on both sides thereof and covering horizontally an upper area, with parts of said guard being supported by spring elements, the two perpendicular parts 1, 2 being liftable from a closed position independently of each other, and an upper part 3, in a closed position, being disposed horizontally and being lifted when lifting a side part 1, 2, characterized in that, via pins 22, said upper part 3 of said guard is pivot-mounted on one side of a frame 23 having the length of said upper part 3, that, via pins 25, said first side part 1 is pivot-mounted on said same side of said frame 23, that, via pins 16, said second side part 2 is pivot-mounted on said upper part 3, and that, via trunnions 24, said frame 23 is pivot-mounted on the other side of machine side frames 6, 7.

Another feature of the invention resides broadly in the guard characterized in that, via pivots 8, the second side part 2 is connected to swivel arms 4 mounted, via bearing journals 5, on the machine side frames 6, 7, and that, via bolts 9, a spring element 10 acts on the swivel arms 4, said spring element supporting the frame 23 in the vicinity of the trunnions 24 via bolts 11.

Examples of printing machines and/or presses in which the present invention may be used in conjunction with or which may contain components and/or accessories that may be used in conjunction with at least one embodiment of the present invention may be found in the following U.S. Patents: U.S. Pat. No. 5,377,587, U.S. Pat. No. 5,377,589, U.S. Pat. No. 5,379,697, U.S. Pat. No. 5,381,734, U.S. Pat. No. 5,383,395, U.S. Pat. No. 5,388,511, U.S. Pat. No. 5,390,597, U.S. Pat. No. 5,392,710, U.S. Pat. No. 5,398,603, U.S. Pat. No. 5,400,709, U.S. Pat. No. 5,404,806, and U.S. Pat. No. 5,408,928.

Examples of protective devices and guards which the present invention may be used in conjunction with or which may contain components and/or accessories that may be used in conjunction with at least one embodiment of the present invention may be found in the following U.S. Patents: U.S. Pat. No. 5,178,069, U.S. Pat. No. 5,460,092, U.S. Pat. No. 5,383,563, U.S. Pat. No. 5,388,540, U.S. Pat. No. 5,396,122, and U.S. Pat. No. 5,438,943; and U.S. patent application Ser. No. 08/377,474.

Examples of circuit breakers and/or components and accessories therefor which may be used in conjunction with at least one embodiment of the present invention may be found in the following U.S. Patents: U.S. Pat. No. 5,379,013, U.S. Pat. No. 5,379,014, U.S. Pat. No. 5,381,119, U.S. Pat. No. 5,381,121, U.S. Pat. No. 5,387,770, U.S. Pat. No. 5,388,022, and U.S. Pat. No. 5,391,930.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 31 643.6, filed on Aug. 29, 1995, having inventor Wolfgang Bitterich, and DE-OS 195 31 643.6 and DE-PS 195 31 643.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

LIST OF REFERENCE NUMERALS 1 side part
2 side part
3 upper part
4 swivel arm
5,5' trunnion
6 machine side frame
7 machine side frame
8 pivot
9 bolt
10 spring element
11 bolt
12 stop
13 cross-member
14 connecting element
15 stop
16 pin
17 pivot
18 supporting member
19 actuating device
20 bearing body
21 bearing body
22 pin
23 frame
24,24' trunnion
25 pin
26 circuit breaker

What is claimed is:

1. A protective guard for a printing machine, the printing machine having two substantially vertical side frames and at least one unit to apply a substance to a sheet to receive the substance disposed between the side frames, the guard having a closed position wherein access to the at least one unit is substantially prevented, said guard comprising:

two side parts;

said two side parts comprising a side part and an additional side part;

said side part and said additional side part both being disposed substantially vertical in a closed position of said guard;

said side part having an upper end portion and a lower end portion disposed opposite one another;

said additional side part having an upper end portion and a lower end portion disposed opposite one another;

an upper part disposed substantially horizontal in a closed position of said guard and connecting said upper end portion of said side part and said upper end portion of said additional side part;

a frame disposed substantially horizontal in a closed position of said guard, and adjacent said upper part in a closed position of said guard;

said frame having a first end portion and a second end portion disposed substantially opposite one another, said first end portion being disposed adjacent said side part and said second end portion being disposed adjacent said additional side part;

said upper part having a first length;

said frame having a second length;

said first length and said second length being substantially equal to one another;

at least one pin configured for pivotally mounting said upper part to said first end portion of said frame;

at least one additional pin configured for pivotally mounting said side part to said first end portion of said frame;

at least one yet another pin configured for pivotally mounting said additional side part to said upper part; and at least one trunnion being configured to be disposed to pivotally mount said frame to at least one side frame of a printing machine.

2. The protective guard according to claim 1, wherein said protective guard further comprises:

at least one swivel arm having a first end and a second end, and said first end of said at least one swivel arm is connected to said additional side part.

3. The protective guard according to claim 2, wherein said protective guard further comprises:

at least one bearing journal having a first portion and a second portion;

said second end of said at least one swivel arm is connected to said second portion of said at least one bearing journal; and said first portion of said at least one bearing journal is mounted on at least one side frame of a printing machine.

4. The protective guard according to claim 3, wherein said protective guard further comprises:

a spring element for supporting said frame and for acting on said at least one swivel arm; and an apparatus for connecting said spring element to said frame and said at least one swivel arm.

5. The protective guard according to claim 4, wherein said apparatus for connecting said spring element two bolts;

at least one of said at least two bolts connecting said spring element to said at least one swivel arm;

at least one additional one of said at least two bolts operatively connecting said spring element to said frame; and said at least one additional one of said at least two bolts is disposed adjacent said at least one trunnion.

6. The protective guard according to claim 5, wherein said protective guard comprises at least one circuit breaker configured to prevent at least one of: a printing machine from being started upon said guard not being in a closed position, and bringing a printing machine to a standstill when said guard is moved out of a closed position.

7. A protective guard for a printing machine, the printing machine having two substantially vertical side frames and at least one unit to apply a substance to a sheet to receive the substance disposed between the side frames, said guard having a closed position wherein access to said at least one unit is substantially prevented, said guard comprising:

two side parts;

said two side parts comprising a side part and an additional side part;

said side part and said additional side part being substantially vertical in said closed position;

an upper part disposed between said side part and said additional side part;

said upper part being substantially horizontal in a closed position of said guard;

an arrangement to permit said side part and said additional side part to be movable from a closed position of said guard independently of one another; and an arrangement to permit said upper part to be movable along with at least one of said two side parts.

8. The protective guard according to claim 7, wherein, via pivots, the additional side part is connected to swivel arms mounted, via bearing journals, on side frames of a printing machine, and that, via at least one bolt, a spring element acts on the swivel arms, said spring element supporting a frame via at least one bolt.

9. The protective guard according to claim 7, wherein said protective guard comprises:

a frame disposed substantially horizontal in a closed position of said guard, and disposed adjacent said upper part in a closed position of said guard;

said frame having a first end portion and a second end portion disposed substantially opposite one another, said first end portion being disposed adjacent said side part and said second end portion being disposed adjacent said additional side part;

said upper part having a first length;

said frame having a second length; and said first length and said second length being substantially equal to one another.

10. The protective guard according to claim 9, wherein said protective guard comprises at least one swivel arm having a first end and a second end; and said first end of said at least one swivel arm is connected to said additional side part.

11. The protective guard according to claim 10, wherein said protective guard comprises:

at least one bearing journal having a first portion and a second portion;

said second end of said at least one swivel arm is connected to said second portion of said at least one bearing journal; and said first portion of said at least one bearing journal is mounted on at least one side frame of a printing machine.

12. The protective guard according to claim 11, wherein said protective guard comprises:

a spring element for supporting said frame and for acting on said at least one swivel arm; and an apparatus for connecting said spring element to said frame and said at least one swivel arm.

13. The protective guard according to claim 12, wherein:

said apparatus for connecting said spring element comprises at least two bolts;

at least one of said at least two bolts connecting said spring element to said at least one swivel arm; and at least one additional one of said at least two bolts operatively connecting said spring element to said frame;

said protective guard comprises at least one trunnion being configured to be disposed to pivotally mount said frame to at least one side frame of a printing machine;

said at least one additional one of said at least two bolts is disposed adjacent said at least one trunnion.

14. The protective guard according to claim 13, wherein said protective guard comprises at least one circuit breaker configured to prevent at least one of: a printing machine from being started upon said guard not being in a closed position, and bringing a printing machine to a standstill when said guard is moved out of a closed position.

* * * * *

UNITED STATES PATENT AND TRADEMARK OFFICE
CERTIFICATE OF CORRECTION

PATENT NO. : 5,699,734
DATED : December 23, 1997
INVENTOR(S) : Wolfgang BITTERICH It is certified that error appears in the above-identified patent and that said Letters Patent is hereby corrected as shown below:

On the title page, item [56], under the FOREIGN PATENT DOCUMENTS section, before '10/1982', delete "00633229" and insert --0063229--.

In column 6, line 58, Claim 5, after 'element' insert --comprises at least--.

Signed and Sealed this

Twenty-ninth Day of December, 1998

Attest:

BRUCE LEHMAN

*Attesting Officer*        *Commissioner of Patents and Trademarks*